INVENTORS:
ERNST DANIEL NYSTRAND
JOHN J. BRADLEY
BY: Dawson, Tilton, Fallon, Lungmus & Alexander
ATT'YS Dec. 20, 1966
E. D. NYSTRAND ETAL
3,292,470
ORBITAL SAW
Filed Oct. 18, 1965
4 Sheets-Sheet 2
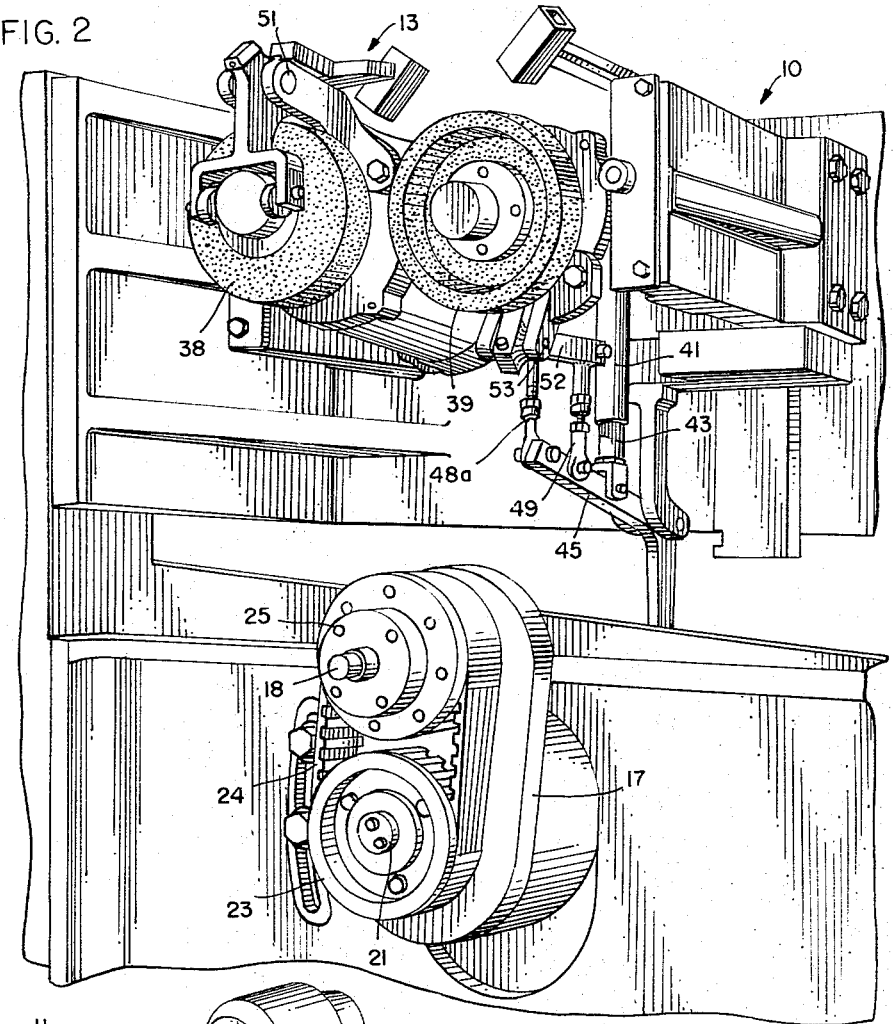
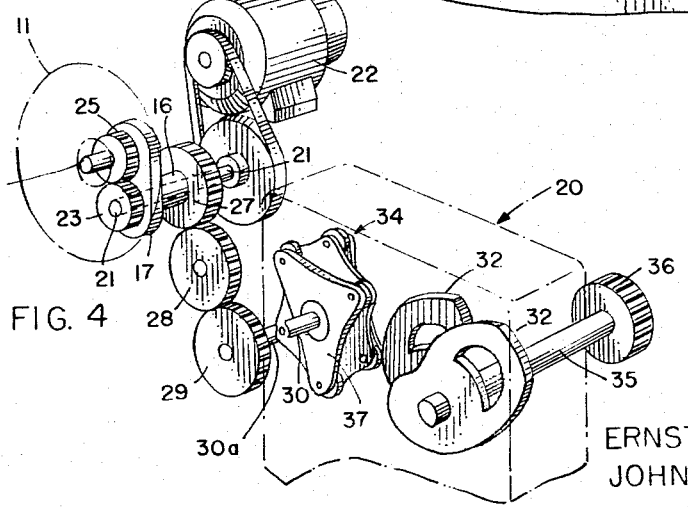
INVENTORS:
ERNST DANIEL NYSTRAND
JOHN J. BRADLEY
BY: *Dawson, Tilton, Fallon, Lungmus & Alexander*
ATT'YS Dec. 20, 1966  E. D. NYSTRAND ETAL  3,292,470
ORBITAL SAW Filed Oct. 18, 1965  4 Sheets-Sheet 3

INVENTORS'
ERNST DANIEL NYSTRAND
JOHN J. BRADLEY
BY: *Dawson, Tilton, Fallon, Lungmus & Alexander*
ATT'YS Dec. 20, 1966   E. D. NYSTRAND ETAL   3,292,470
ORBITAL SAW
Filed Oct. 18, 1965   4 Sheets-Sheet 4

INVENTORS:
ERNST DANIEL NYSTRAND
JOHN J. BRADLEY
BY: Dawson, Tilton, Fallon, Lungmus & Alexander
ATT'YS

3,292,470
ORBITAL SAW
Ernst Daniel Nystrand and John J. Bradley, Green Bay Wis., assignors to Paper Converting Machine Company, Inc., Green Bay, Wis., a corporation of Wisconsin
Filed Oct. 18, 1965, Ser. No. 497,420
2 Claims. (Cl. 83—174

This invention relates to an orbital saw, and, more particularly, to a saw adapted for the high speed cutting of logs or rolls of paper.

This invention constitutes an improvement on the copending application of Ernst D. Nystrand, Serial No. 385,022, filed July 24, 1964; U.S. Patent No. 3,213,734 granted October 26, 1965.

In the above-mentioned patent, a disc saw is orbited at a faster velocity during cutting than during the remaining portion of its orbit—the remaining portion of the orbit being employed for intermittently advancing the log roll. Such log rolls are commonly provided in the production of toilet tissue, toweling and the like, and must be severed transversely in order to provide retail-sized rolls. The instant application has as its object the same as that of the above-mentioned patent but with the use of different equipment to provide a superior control of the acceleration of a saw in different portions of the orbit. Additionally, the invention makes possible the sharpening of the disc saw in a novel fashion.

Figure 1:
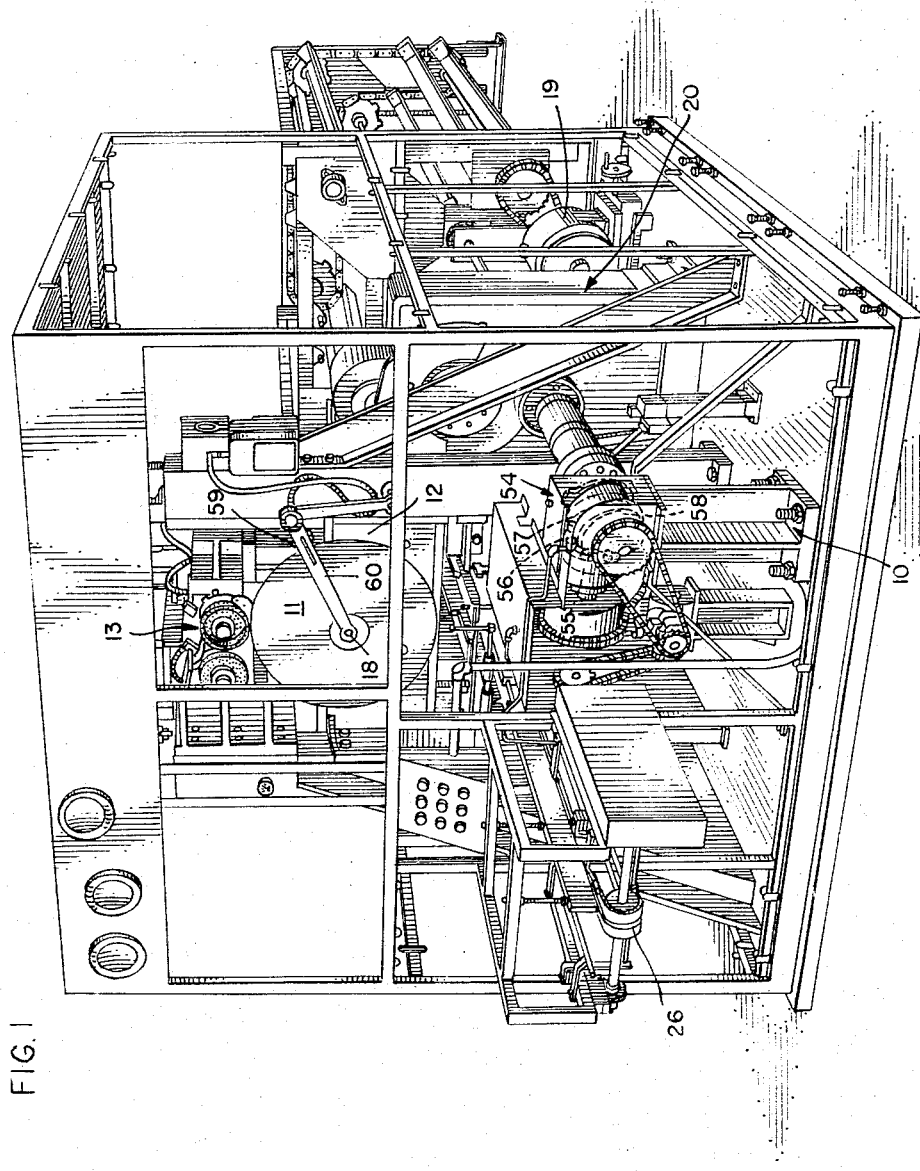
Figure 3:
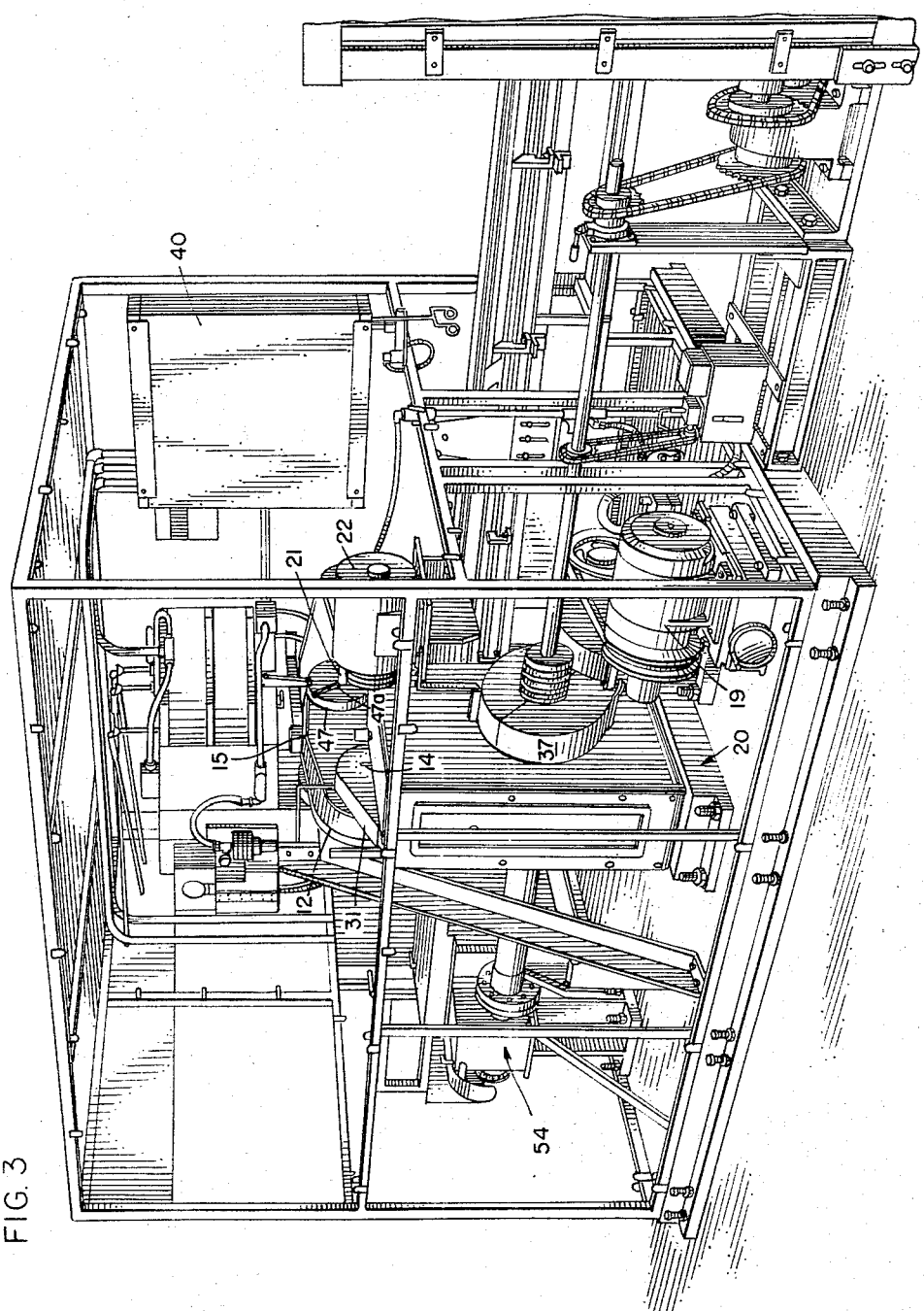
Figure 5:
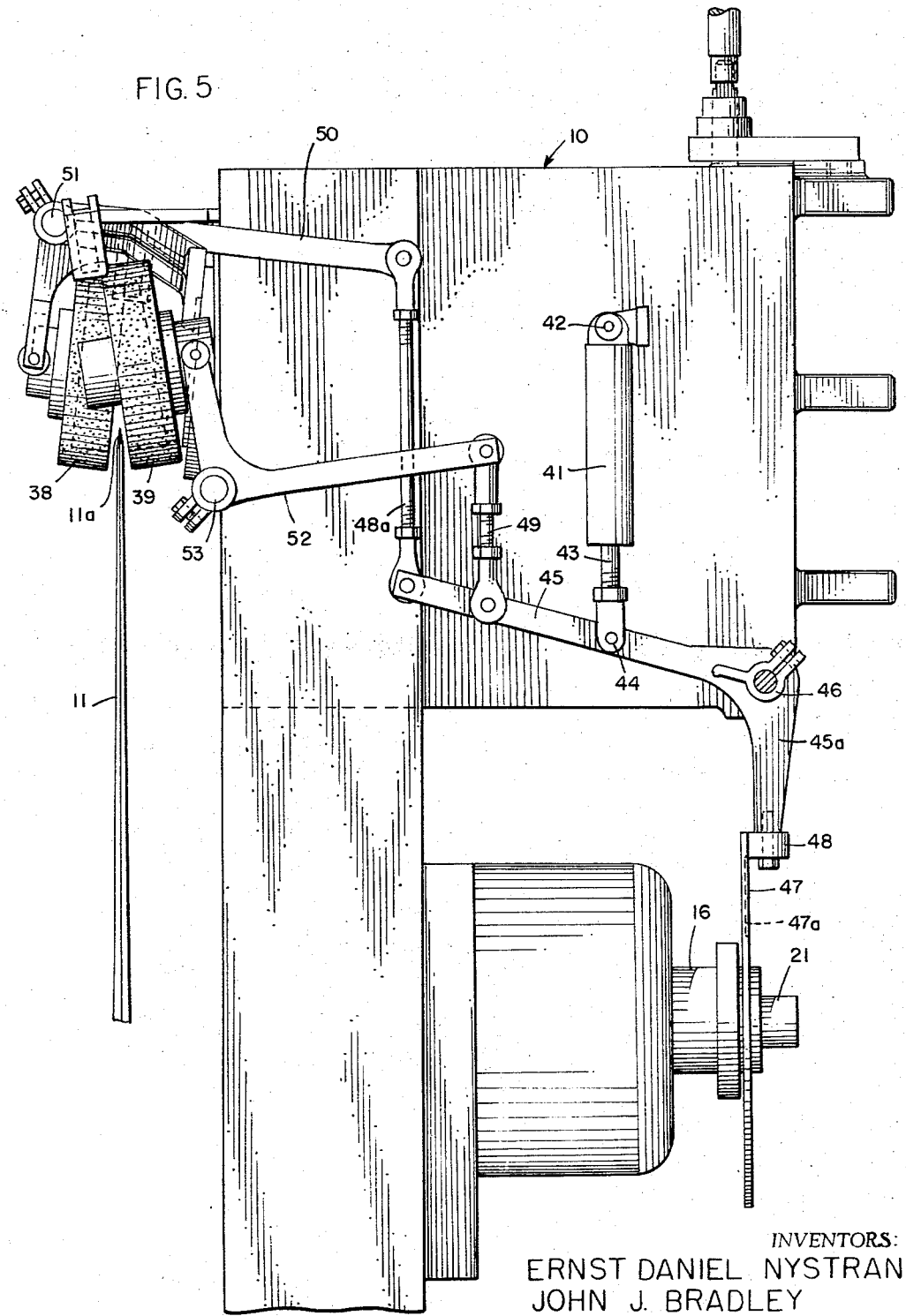

The invention is explained in conjunction with the accompanying drawing, in which FIG. 1 is a perspective view of the inventive orbital saw as viewed from the discharge end and wherein the disc or circular saw is seen to be mounted centrally of the apparatus; FIG. 2 is a fragmentary perspective view taken from about the same point of vantage as that of FIG. 1, but wherein the circular saw disc has been removed to reveal the means for orbiting the same; FIG. 3 is a perspective view of the orbital saw from the log entering end; FIG. 4 is a schematic perspective view of the power train for orbiting the saw; and FIG. 5 is a fragmentary side elevational view in section of the apparatus for selectively energizing the sharpening means associated with the orbital saw and which can also be seen in fragmentary form in FIG. 2.

In the illustration given and with reference to FIG. 1, the numeral 10 designates generally a heavy supporting frame for carrying in orbital fashion a disc saw 11. The frame 10 includes a transverse beam 12 on which the disc saw 11 is carried. Inasmuch as the saw is "ground down" by means of a sharpening device generally designated 13 (see FIGS. 1 and 2), provision is made for lowering the saw 11 (as wear occurs) by virtue of pivotedly mounting the transverse beam 12 about an axis 14 (see FIG. 3) which corresponds to the transmission shaft delivering rotational power to a casing 15 carrying gearing of the nature seen in FIG. 4. The casing 15 is boltably secured to the transverse beam 12.

The rotational power delivered to the casing 15 is taken therefrom by means of an output shaft 16 (see FIG. 4) and which is equipped with a head 17. The head 17 rotatably carries the shaft 18 (also see FIG. 2) on which the disc saw 11 is carried. Thus, as the shaft 16 is turned, as by means of a motor 19 (see FIG. 1) through an indexing mechanism generally designated 20, the head 17 rotates and orbits the shaft 18 about the axis of the shaft 16. The shaft 16 is seen to be hollow and rotatably carries a shaft 21. The shaft 21 is powered by a second motor 22 and terminates in a drive gear 23 (see FIGS. 2 and 4). The drive gear 23 is coupled by means of a ribbed belt 24 to a driven gear 25 fixed to the shaft 18. Thus, the motor 22 provides rotational power for the disc blade 11 so as to operate the same at a relatively high speed, i.e., of the order of 1500 r.p.m. In contrast to this, the shaft 16 rotates the head 17 on the order of 200 cycles per minute so that the disc blade 11 in the illustrated embodiment is rotating about its own axis about 7½ times for each orbit.

The invention is concerned with developing a non-linear orbital velocity of the blade 11 which provides two advantages. The orbital movement of the blade 11 is such that a minor portion of the orbit time is spent with the blade in contact with a log roll supported on a conveyor 26. Thus, a major portion of the orbit time is reserved for intermittently advancing the log roll on the conveyor 26. The second advantage relates to an actual stoppage of the blade for sharpening.

As in the above-mentioned patent, a pair of roll-carrying troughs may be provided as part of the conveyor 26 and these are positioned so as to have the log rolls carried thereon cut at about the nadir of the orbit of the disc saw 11. Inasmuch as the orbiting blade 11 is moving generally horizontally during the cutting operation ond because there is no reciprocation, the sawing operation being characterized by only downward and forward movement of the blade 11, it is unnecessary to tightly clamp the log. With the instant construction, indexing of the log rolls is achieved during the upper half of the orbit of the disc blade 11, the blade entering the log in the righthand trough of FIG. 1, for example, at about four o'clock in the orbit.

In the specific illustration given, and in order to optimize the speed of operation, two-thirds of each complete time cycle is used for indexing the log rolls forwardly. This is accomplished by causing the orbiting head 17 to move through its lower 180° of rotation (devoted to the cutting operation) during 120° (or one-third) of each complete time cycle—and the upper 180° of rotational movement being devoted to log indexing during about 240° or two-thirds of each complete time cycle. This non-linear velocity of movement of the head 17 (and hence the saw disc 11) poses problems of acceleration which are solved by the power trains which will now be described.

Head orbit power train

The power train for orbiting the head 17 can be seen in FIG. 4. For ease of understanding, the schematic picturization in FIG. 4 is described working from the output end, i.e., the orbiting head 17 back to the power input end. Thus, it is seen that the shaft 16 to which the head 17 is affixed has coupled to it a gear 27—this being housed within the gear housing 15 of FIG. 3. The gear 27 is rotated by an intermediate gear 28 also suitably journalled within the housing 15. Yet a third gear 29 is journalled within the housing 15 and this receives output power from an indexing unit generally designated 20 (also seen in FIG. 3). For convenience of picturization, reduction gears between the output shaft 30 of the indexing means 20 and the input shaft 30a of the gear 29 have been omitted, these being provided within the guard casing 31 seen in the central portion of FIG. 3. By providing an odd number of gears between the gears 27 and 29 we make possible the proper positioning of the saw 11 for sharpening, irrespective of the pivotal position of beam 12.

The indexing means 20 is a positive position cam indexer catalog No. 1200P3496–300 manufactured by Commercial Cam & Machine Co., of Chicago, Illinois. The important camming elements of the indexer 20 are pictured in FIG. 4 and are seen to include a pair of oppositely mounted lobe cams 32 and 33 fixed to the output shaft 30. These cams 32 and 33 coact with an input cam generally designated 34 and which is fixed to the power input shaft 35. The power input shaft is equipped with a gear 36 shielded by the guard casing 37 in FIG. 3. Through a positive drive, the input shaft 35 receives rotational power from the orbiting motor 19.

The main input cam 34 is seen to be equipped with six cam rollers as at 37 and the cam 34 rotates at a uniform speed. Because of the placement of the lobe on the cams 32 and 33, adjacent cam rollers 37 coact to intermittently turn the output shaft 30 and when the shaft 30 is turned, it is turned wih a non-uniform velocity, i.e., variable acceleration.

Further, cams 32 and 33 are so contoured and arranged relative to each other that once each orbit of the head 17, the head 17 is stopped at the twelve o'clock position, for a time corresponding to about one-sixth of the orbit cycle time. This permits sharpening of the disc blade 11 by virtue of the sharpening means 13. We find it advantageous to selectively actuate the sharpening means 13 so that sharpening occurs once every few orbits, and during the time when disc saw blade 11 is stationary—yet rotating. Under the specific conditions outlined above with a blade rotational speed of 1500 r.p.m. and an orbit speed of 200 r.p.m., there is provided seven and one-half revolutions of the disc blade 11 about its own axis for each orbit of the head 17. With one-sixth of the orbit being used for sharpening, this means that there will be more than one revolution of the blade 11, i.e., on 1.25 revolutions during the sharpening period. This insures complete and uniform sharpening of the blade 11.

Before describing the second power train which is used in connection with the non-linear advancement of the conveyor 26, the mechanism for selectively actuating the sharpening means will be described.

*Mechanism for actuating sharpening means*

Reference is now made to FIG. 5 which is a fragmentary side elevational view of the upper portion of the saw. At the extreme lower left in FIG. 5, the disc saw 11 is seen and it will be noted that the saw has a double bevelled edge as at 11a develped by the co-operation of grinding wheels 38 and 39. In general, the operation of the grinding wheels 38 and 39 includes means for positioning these wheels in very close but spaced relation to the disc saw 11 as the latter approaches the twelve o'clock position in that orbit where sharpening is desired. If, for example, sharpening is desired only once every ten orbits, the sharpening wheels 38 and 39 will be maintained a half inch or so away from the saw 11 except in the tenth orbit. In that orbit, the grinding wheels 38 and 39 are brought to within about ⅛" spacing relative to the blade 11 and when the orbit stops for the above-mentioned one-sixth cycle, the wheels 38 and 39 are immediately brought into contact with the still rotating disc blade 11. Thus, there is no sharpening of the blade when the blade is orbiting, productive of a much longer working life.

In FIG. 3, the numeral 40 designates a timing and control box which is effective to select that orbit in which the sharpening occurs. That unit 40 is effective to deliver a pneumatic signal (in the illustration given) to an air cylinder 41 pivotally mounted as at 42 on the frame 10. The cylinder 41 is equipped with a piston rod 43 which operates through bell crank linkages to position the grinding wheels 38 and 39 within the above-mentioned ⅛" spacing relative to the disc saw 11. Here, it should be appreciated that the specific details of speed, spacing, etc., are put down for the purpose of explanation and for ease of understanding the operation of the invention and are not to be considered limitations in the practice thereof. However, we have found that advantageously high speed operation can be obtained utilizing the parameters above given.

For the purpose of translating the extension of the piston rod 43 is pivotally connected as at 44 to an arm 45. The arm 45 is generally L-shaped having a depending portion 45a, the arm 45 being pivotally mounted as at 46 on the frame 10. We interpose a flexural pivot at 46 which may be catalog No. 5024–600 manufactured by Bendix Corporation. Such a flexural pivot permits limited rotational movement of the arm 45 under the urging of the piston rod 43, but opposes the same, tending to return the arm 45 to its original position—wherein the grinding wheels 38 and 39 are positioned a spaced distance from the disc blade 11 of the order of ½". The depending arm portion 45a of the arm 45 limits the inward movement of the grinding wheels 38 and 39 by virtue of contacting a plate 47 mounted on the shaft 16. The plate 47 is equipped with a radial slot 47a (see also FIG. 3) which permits the arm 59 to move to the left (as shown in FIG. 5) the additional ⅛" previously mentioned so as to bring the grinding wheels 38 and 39 into contact with the saw blade 11. For this purposes, the depending arm portion 45a is equipped with a follower as at 48.

Thus, during the orbit wherein sharpening is desired, the majority of movement of the sharpening wheels 38 and 39 is achieved by the action of the cylinder 41 operating against the flexural pivot 46 with the last part of the movement of the wheels 38 and 39 toward each other being achieved through the further urging of the cylinder 41 which is accommodated by the slot 47a in the plate 47. This two-phase motion is transmitted to the grinding wheels 38 and 39 by means of connecting rods 48 and 49, respectively. The connecting rod 48 in turn is pivotally connected to an L-shaped bell crank 50 pivotally mounted on the frame 10 as at 51. The connecting rod 49 is coupled to the grinding wheel 49 by means of a second bell crank 52 pivotally mounted on the frame as at 53.

In the operation of the sharpening means 13, it will be seen that as soon as the orbiting movement of the head 17 is re-initiated—by virtue of the restart of rotation of the shaft 16, the plate 47 is similarly rotated to move the slot 47a out of register relative to the follower 48. This immediately latches the grinding wheels 38 and 39 out of contact with the disc blade 11, insuring that there is no sharpening carried on when the blade 11 is orbiting.

*Conveyor power train*

A second positive position cam indexer generally designated 54 is utilized in the operation of the inventive saw so as to optimize performance thereof. Heretofore, the problem has been to advance the log roll more times per minute in order to get a greater number of transverse cuts. However, this created two great log accelerations, losing control over the log position—resulting in improperly sized rolls. Thus, it was necessary to advance the logs more slowly, taking a greater portion of the cycle. Avoidance of this limitation is achieved by the instant invention and also by the elliptical gears provided in the above-mentioned patent. However, the instant invention provides a more advantageous control over the acceleration of the logs during the two-thirds cycle time allotted. By utilizing positive position cams in the indexer 54, it is possible to obtain a relatively low acceleration at the beginning of the log index so as to avert any possibility that the logs will be jolted forwardly and out of proper position relative to the pushing means or other log engagement means on the conveyor 26. For this purpose, we find it advantageous to employ a catalog number CC6H32–240LH indexer provided by Commercial Cam & Machine Co., of Chicago, Illinois. The cam arrangement seen at 54 in FIG. 1 (including output plate 55 with rollers 56 riding in grooves 57 of cam 58) is especially advantageous in developing the acceleration program used in the inventive saw, having superior acceleration characteristics as compared with crank and Geneva indexers. The positive position cam indexer is able to mechanically positively hold its output shaft in a predetermined position relative to the input shaft at all times so that during cutting there is no movement of the conveyor 26 and during sharpening there is no movement of the saw 11. During the entire cycle, lubricating or coiling fluid is supplied to the periphery of saw 11 by nozzle 59 mounted on a linkage 60 interconnected between frame 10 and shaft 18.

We claim:

1. An orbital saw for radially cutting elongated paper rolls comprising a frame, conveying means on said frame for intermittently advancing said rolls along a path longitudinally thereof, a disc saw orbitally mounted on said frame adjacent said conveying means, means for rotating said disc saw, and means for orbiting said saw in a plane transverse of said path to pass said saw through a roll in said path in one portion of the saw orbit and for developing a faster orbital velocity of said saw in said one orbit portion than in the remainder of the orbit, said orbiting means including a motor and a gear-equipped shaft and a cam indexer interposed between said motor and shaft and coupled thereto for stopping the orbital motion of said saw once each orbit in addition to developing the above-mentioned different velocities whereby said saw is adapted to be sharpened during stoppage thereof.

2. The structure of claim 1 in which said frame is equipped with a pair of grinding wheels adapted to engage opposite sides of said disc saw for sharpening the same, and latch means coupled to said wheels and to said shaft for selectively moving said wheels into contact with said saw during orbital movement stoppage thereof.

No references cited.

WILLIAM W. DYER, JR., *Primary Examiner.*

J. MEISTER, *Assistant Examiner.*